United States Patent
Igarashi et al.

(10) Patent No.: US 7,495,238 B2
(45) Date of Patent: Feb. 24, 2009

(54) TWO-DIMENSIONAL PATTERNING METHOD, ELECTRONIC DEVICE USING SAME, AND MAGNETIC DEVICE FABRICATING METHOD

(75) Inventors: Shinichi Igarashi, Ibaraki (JP); Akiko Nakamura, Ibaraki (JP); Masahiro Kitajima, Ibaraki (JP)

(73) Assignees: Japan Science and Technology Agency, Saitama (JP); National Institute for Materials Science, Ibaraki (JP)

(*) Notice: Subject to any disclaimer, the term of this patent is extended or adjusted under 35 U.S.C. 154(b) by 330 days.

(21) Appl. No.: 10/566,158

(22) PCT Filed: Jul. 27, 2004

(86) PCT No.: PCT/JP2004/011025

§ 371 (c)(1),
(2), (4) Date: Jan. 27, 2006

(87) PCT Pub. No.: WO2005/010968

PCT Pub. Date: Feb. 3, 2005

(65) Prior Publication Data

US 2006/0211258 A1    Sep. 21, 2006

(30) Foreign Application Priority Data

Jul. 29, 2003    (JP)    ............... 2003-282196

(51) Int. Cl.
*A61N 5/00*    (2006.01)

(52) U.S. Cl. .............. 250/492.2; 250/492.21; 250/492.22; 250/492.3; 250/492.1

(58) Field of Classification Search .... 250/491.1–492.3
See application file for complete search history.

(56) References Cited

U.S. PATENT DOCUMENTS

| | | | | | |
|---|---|---|---|---|---|
| 4,843,238 | A | * | 6/1989 | Nishioka et al. | 250/252.1 |
| 5,660,957 | A | * | 8/1997 | Chou et al. | 430/5 |
| 6,197,697 | B1 | * | 3/2001 | Simpson et al. | 438/705 |
| 6,225,193 | B1 | * | 5/2001 | Simpson et al. | 438/460 |
| 6,407,399 | B1 | * | 6/2002 | Livesay | 250/492.3 |
| 7,038,290 | B1 | * | 5/2006 | Li | 257/506 |

* cited by examiner

*Primary Examiner*—Jack I Berman
*Assistant Examiner*—Andrew Smyth
(74) *Attorney, Agent, or Firm*—Wenderoth, Lind & Ponack, L.L.P.

(57) ABSTRACT

A novel two-dimensional patterning method enabling two-dimension patterning without using any photosensitive material and ion milling, wherein a two-dimensional pattern is formed by destroying a blister provided on a substrate by electron or ion irradiation.

18 Claims, 7 Drawing Sheets

(a)

(b)

(c)

(d)

TWO-DIMENSIONAL PATTERNING METHOD, ELECTRONIC DEVICE USING SAME, AND MAGNETIC DEVICE FABRICATING METHOD

TECHNICAL FIELD

The present invention relates to a two-dimensional patterning method, and a manufacturing method of electronic device and magnetic device using the two-dimensional patterning method. More particularly, the invention relates to a novel two-dimensional patterning method capable of patterning two-dimensionally without using any photosensitive material or ion milling, useful in fine processing technology, or fabrication of electric device, semiconductor device, magnetic device, and others, and a novel manufacturing method of electronic device and magnetic device using the two-dimensional patterning method.

BACKGROUND ART

Conventionally, as two-dimensional patterning technology, combination of lithography and etching has been widely known. Technology of lithography includes a technique of applying a photosensitive material, and then exposing the photosensitive material by light or electrons by using a mask, and a technique of exposing a photosensitive material directly by focused electron beam (see, for example, non-patent documents 1, 2), and by using the photoresist patterns formed by these techniques of lithography as the mask, etching is executed, and a circuit pattern such as fine electrodes or wiring can be formed on a wafer surface.

There is also a technique called ion milling for directly carving a substrate finely by using FIB (focused ion beam) (see, for example, non-patent documents 3, 4, 5).

Non-patent document 1: M. Rothschild and D. J. Ehrlich, J. Vac. Sci. Tech. B6, 1 (1988)

Non-patent document 2: A. Heuberger, J. Vac. Sci. Tech. B6, 107 (1988)

Non-patent document 3: R. Kubena et al., J. Vac. Sci. Tech. 19, 916 (1981)

Non-patent document 4: T. Ishitani et al., Jpn. J. Appl. Phys. 24, L133 (1985)

Non-patent document 5: J. P. Sudraud et al., J. Vac. Sci. Tech. B6, 234 (1988)

DISCLOSURE OF INVENTION

However, the technology of lithography or etching is always accompanied by the processes of applying photosensitive material, developer and etchant, and removing the photosensitive material by stripping solution, and due to such processes, impurity atoms of photosensitive material or removing agent may invade into the device, and it is hard to avoid contamination. The related cleaning operation of substrate surface makes the patterning process much complicated.

In ion milling by FIB, too, contamination by Ga and other ions cannot be avoided.

In the light of the above background, it is an object of the present invention to present a novel two-dimensional patterning method capable of patterning two-dimensionally without using any photosensitive material or ion milling, and a novel manufacturing method of electronic device and magnetic device using the two-dimensional patterning method.

In order to achieve the above-described object, a first aspect of the present invention provides a two-dimensional patterning method, wherein a two-dimensional pattern is formed by destroying a blister disposed on a substrate by electron irradiation.

A second aspect of the invention provides a two-dimensional patterning method, wherein a two-dimensional pattern is formed by destroying a blister disposed on a substrate by ion irradiation.

A third aspect of the invention provides a two-dimensional patterning method, wherein a two-dimensional pattern of uncoated clean surface is formed by forming a film on a blister disposed on a substrate and destroying and removing the blister together with the formed film by electron irradiation or ion irradiation.

A fourth aspect of the invention provides a two-dimensional patterning method, wherein a two-dimensional pattern of a non-reacted clean surface is formed by executing surface reaction on a blister disposed on a substrate, and destroying and removing the blister together with the reacted film by electron irradiation or ion irradiation.

A fifth aspect of the invention provides a two-dimensional patterning method, wherein a two-dimensional pattern is formed by forming a film on a blister disposed on a substrate and destroying and removing the blister together with the formed film by electron irradiation or ion irradiation, and further by forming a film on the surface from which the blister has been destroyed and removed with the use of difference in adsorption probability between the substrate surface protected by the blister and the surface not protected.

A sixth aspect of the invention provides a two-dimensional patterning method, wherein a two-dimensional pattern is formed by executing surface reaction on a blister disposed on a substrate and destroying and removing the blister together with the reacted film by electron irradiation or ion irradiation, and further by executing chemical reaction on the surface from which the blister has been destroyed and removed with the use of difference in reactivity between the substrate surface protected by the blister and the surface not protected.

A seventh aspect of the invention provides a two-dimensional patterning method, wherein the substrate is a silicon substrate or a metal substrate.

An eight aspect of the invention provides a two-dimensional patterning method, wherein the blister is formed by hydrogen ion irradiation, deuterium ion irradiation, or helium ion irradiation.

A ninth aspect of the invention provides a two-dimensional patterning method, wherein the blister having a patterned configuration is formed by ion irradiation through a mask.

A tenth aspect of the invention provides a two-dimensional patterning method, wherein the blister having a patterned configuration is formed by using focused ion beam.

An eleventh aspect of the invention provides a two-dimensional patterning method, wherein the application ion is any one of $Ar^+$, $Kr^+$, and $Xe^+$.

A twelfth aspect of the invention provides a two-dimensional patterning method, wherein the two-dimensional pattern is a pattern of an atomic species of a surface constituent atom.

A thirteenth aspect of the invention provides a two-dimensional patterning method, wherein the two-dimensional pattern is a pattern different in film formed in a lower layer than a surface layer.

A fourteenth aspect of the invention provides a two-dimensional patterning method, wherein the two-dimensional pattern is an electric characteristic pattern.

A fifteenth aspect of the invention provides a two-dimensional patterning method, wherein the two-dimensional pattern is a reactive pattern.

A sixteenth aspect of the invention provides a two-dimensional patterning method, wherein the two-dimensional pattern is an affinity pattern.

A seventeenth aspect of the invention provides a two-dimensional patterning method, wherein the two-dimensional pattern is a hydrophilic or hydrophobic pattern.

An eighteenth aspect of the invention provides a manufacturing method of electronic device, wherein the above-described two-dimensional patterning method is employed.

A nineteenth aspect of the invention provides a manufacturing method of magnetic device, wherein the above-described two-dimensional patterning method is employed.

Figure 1:
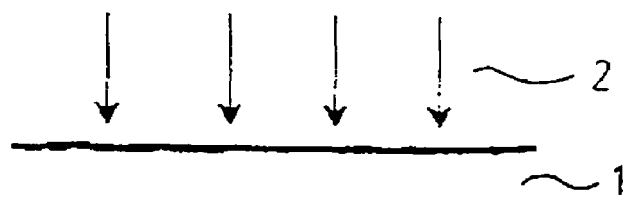
FIG. 1(a) to (d) are diagrams for explaining two-dimensional patterning using a blister according to the invention.
Figure 1:
Figure 1:
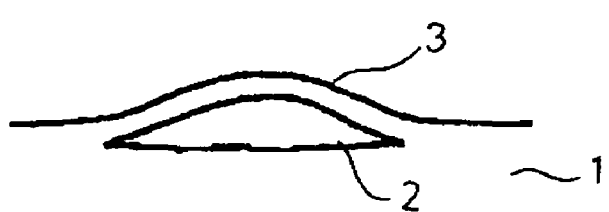
Figure 1:
Figure 1:
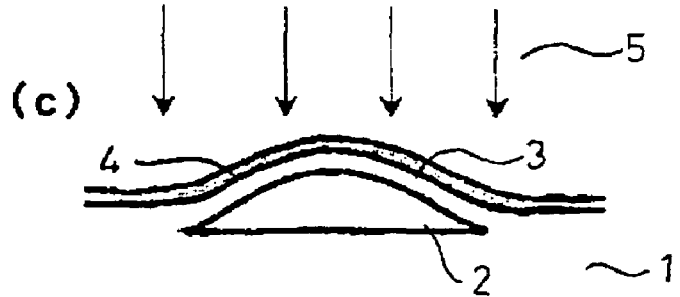
Figure 1:
Figure 1:

In the drawings, reference numerals are as follows.
1 Substrate
2 Gas ion
3 Blister
4 Oxide film
5 Electron beam, ion
6 Oxide surface
7 Clean surface
8 Si
9 Metal
10 Vapor deposition
11 Hetero atom

BEST MODE FOR CARRYING OUT THE INVENTION

FIG. 1(a) to (d) are diagrams for explaining two-dimensional patterning using a blister according to the invention. In FIG. 1, for the sake of convenience, the scale in the vertical direction is emphasized.

First, on a substrate (1) such as silicon substrate or metal substrate, gas ions (2) of low solubility such as hydrogen ions, deuterium ions, or helium ions are implanted (FIG. 1(a)), and the gas ions (2) are accumulated in a specified depth range in the substrate (1), and a dome-like swelling called blister (3) is formed (FIG. 1(b)). When this substrate (1) is exposed to oxygen atmosphere, an oxide film (4) is formed on the surface (FIG. 1(c)). After discarding the oxygen, when electron beam or ion (5) (hereinafter called electron beam/ion (5)) is applied on the blister (3) from above the oxide film (4), the blister (3) receiving this energy is destroyed together with the oxide film (4), and is stripped off (FIG. 1(d)). In the vacant area stripped of the blister (3), a clean surface of the substrate (1) appears.

In this series of operation, a two-dimensional pattern of oxide surface (6) and local clean surface (7) is formed on the substrate surface.

The step gap of the oxide surface (6) of non-stripped portion and the clean surface (7) of stripped portion is determined by electron species, ion species, electron energy, ion energy, and incident angle of the electron beam/ion (5) to be applied. Area of the stripped portion and number density of the stripped portion can be adjusted by irradiation amount of the electron beam/ion (5).

In addition, by selecting a region with the use of a mask and then applying ions or by applying focused ion beam, it is possible to form a blister (3) having patterned configuration and strip it regularly.

The ion (5) to be applied may include, for example, $Ar^+$, $Kr^+$, $Xe^+$, etc.

Figure 2:
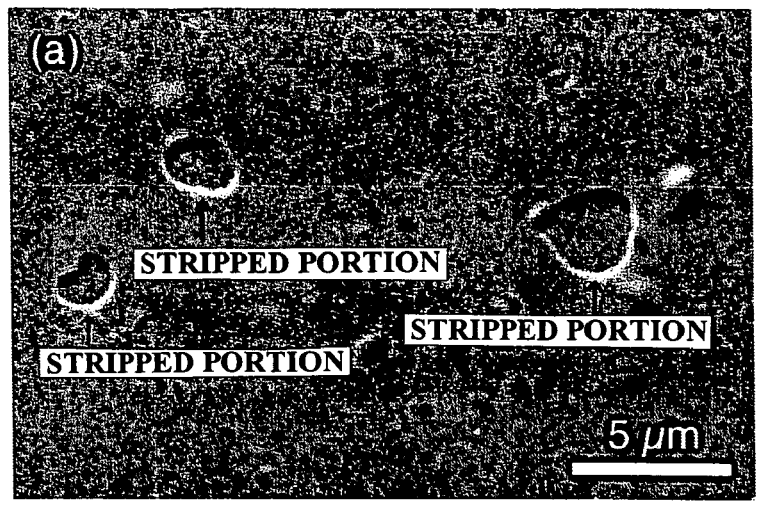
FIG. 2(a) to (c) are photographs of actually observed SEM images.
Figure 2:
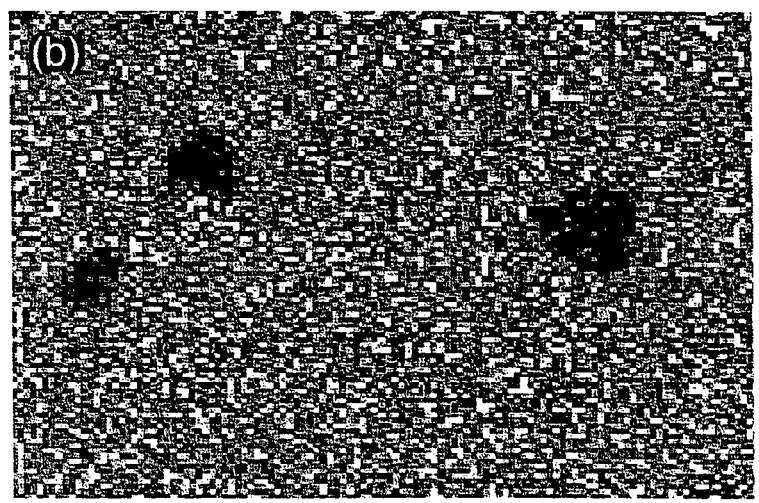
Figure 2:
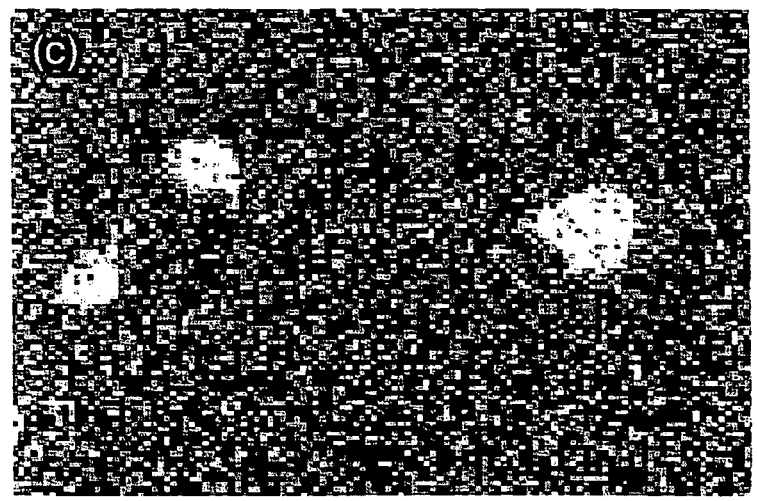

Hereinafter, an example of an actual observation is explained. On an Si (100) substrate, hydrogen ions $H^+$ were applied from direction of 30 degrees with respect to a surface normal line by $1\times10^{22}$ ions/m$^2$, and after exposing to oxygen gas atmosphere, the surface was observed by a scanning Auger microscope (Ulvac Phi type SAM680). FIGS. 2(a) to (c) show observed images.

First, by $H^+$ irradiation, a blister in a size of about several microns was formed. Subsequently, when electron beam of energy of 5 keV was applied for about 1 minute at current density of 4 mA/cm$^2$, the blister receiving this energy was stripped as shown in FIG. 2(a) (see "STRIPPED PORTION" in the drawing). Size of the stripped portion is nearly equal to that of the blister, being about several microns. From calculation by TRIM98 simulation code, the implanted $H^+$ is estimated to be distributed to a depth of about 0.1 micron. Accordingly, the step difference of the substrate surface and the stripped portion is estimated to be about 0.1 micron.

FIG. 2(b) shows element mapping which visualizes O (KLL) Auger peak (510 eV) intensity, and FIG. 2(c) shows mapping by Si (LVV) Auger peak (96 eV). As compared with the substrate surface, the Auger peak of O was not observed in the stripped portion, and a strong Si Auger peak was observed. On the uniformly oxidized substrate surface, it shows that a clean Si substrate surface not reacted with O appears in the stripped portion. Since hydrogen termination enables uniform thickness stripping of silicon unsaturated bond in the substrate, this stripped surface is also hydrogen terminated. By using an ion not reactive to the substrate, it is possible to expose an active silicon substrate surface. Thus, in a clean environment, a two-dimensional pattern of Si and $SiO_2$ is fabricated in a nearly perfect flat surface, that is, at undulation of about 0.1 micron.

As an application, by fabricating a two-dimensional pattern on a silicon substrate and applying vapor deposition to its surface, a device locally having a three-dimensional laminated structure can be manufactured.

Figure 3:
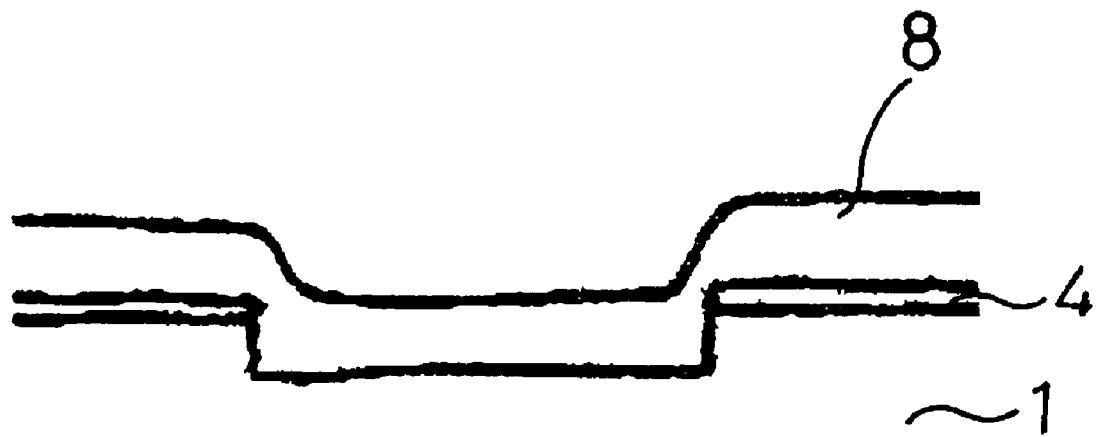
FIG. 3 is a schematic diagram of another embodiment of the invention.

For example, as shown in FIG. 3, when Si (8) is vapor-deposited after stripping the blister, a structure locally enclosing $SiO_2$, an electric insulating layer, by Si can be fabricated. Hence, in SOI (silicon-on-insulator) structure, an electric conductive route of silicon thin film and substrate silicon can be manufactured.

Figure 4:
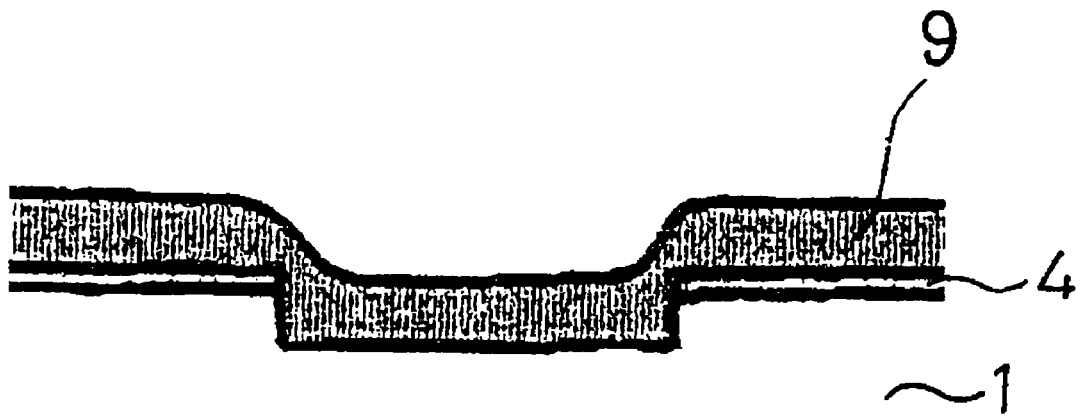
FIG. 4 is a schematic diagram of another embodiment of the invention.

Alternatively, for example, when vapor deposition species is metal (9) as shown in FIG. 4, a pattern of a metal electrode in a MOS (metal-oxide-silicon) transistor is formed.

Figure 5:
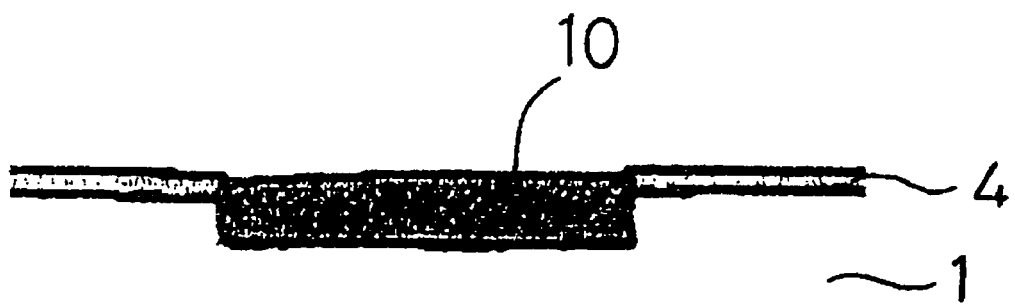
FIG. 5 is a schematic diagram of another embodiment of the invention.

Further, by making use of selectivity of adsorption and reaction, that is, by making use of adsorption probability or reactivity of a substrate surface protected by blister with a substrate surface not protected, vapor deposition (10) may be applied only to the stripped portion as shown in FIG. 5, and it can be a useful technique for direct patterning on surface.

Figure 6:
FIG. 6 is a schematic diagram of another embodiment of the invention.

Not limited to two-dimensional patterning of silicon oxide film as mentioned above, as shown in FIG. 6 for example, a two-dimensional pattern can be fabricated by ion or electron irradiation after vapor depositing a hetero atom (11).

Figure 7:
FIG. 7 is a schematic diagram of another embodiment of the invention.

Further, as shown in FIG. 7, a two-dimensional pattern can be fabricated by vapor depositing a hetero atom (11) after forming an oxide film (4).

Also on these occasions (FIGS. 6 and 7), patterning can be carried out with a surface being flat to the greatest extent possible with an undulation of less than 0.1 micron.

Thus, by using the above-described two-dimensional patterning method, an electronic device or a magnetic device having a good pattering can be fabricated.

Of course, the present invention is not limited to these embodiments, and may be changed and modified in detail. For example, possible two-dimensional patterns include a pattern of atomic species of surface constituent atoms as mentioned above, a pattern of different film in a lower layer than a surface layer, an electric characteristic pattern, or a reactivity pattern representing hydrophilicity, hydrophobicity or affinity. In particular, for the hydrophilic pattern or hydrophobic pattern, the present invention without residue of impurities is very useful.

INDUSTRIAL APPLICABILITY

According to the two-dimensional patterning method, two-dimensional pattern can be realized without using photosensitive material or ion milling, and patterned fine processing is possible only by substrate material, film forming material, ion of insoluble gas and electron. Since there is no intrusion of hetero atom, effects of contamination by impurities can be eliminated.

By adjusting the ion energy, the etching depth can be controlled, and very thin etching is also possible. Thus, a pattern can be formed on a practical flat surface of undulation of less than 0.1 micron.

According to the manufacturing method of electronic device and manufacturing method of magnetic device, favorable electronic device and magnetic device having excellent patterning can be manufactured.

As described in detail herein, the invention presents a novel two-dimensional patterning method capable of patterning two-dimensionally without using any photosensitive material or ion milling, and a novel manufacturing method of electronic device and magnetic device using the two-dimensional patterning method.

Since two-dimensional patterning can be realized without using chemicals or impurities which have been indispensable in the prior art of lithography, impurity contamination is prevented, and a device can be manufactured in a clean environment. Besides, since the processes of application and removal of photosensitive material and etching can be omitted, manufacturing process is simplified and the cost is curtailed. Since the processes are saved, all operation can be finished in one vacuum chamber, which leads to saving of space.

The invention claimed is:

1. A two-dimensional patterning method comprising:
   implanting gas ions on a substrate in a desired pattern to form a blister having a dome-shaped swelling in a specified depth range in the substrate; and
   destroying the blister by electron irradiation or ion irradiation to form a two-dimensional pattern with a specified depth.

2. The two-dimensional patterning method according to claim 1, further comprising:
   after forming the blister,
   forming a film on the blister, and
   destroying and removing the blister together with the formed film by electron irradiation or ion irradiation to form a two-dimensional pattern of an uncoated clean surface.

3. The two-dimensional patterning method according to claim 1, further comprising:
   after forming the blister,
   executing surface reaction on the blister to form a reacted film, and
   destroying and removing the blister together with the reacted film by electron irradiation or ion irradiation to form a two-dimensional pattern of a clean surface.

4. The two-dimensional patterning method according to claim 2, further comprising:
   after destroying and removing the blister together with the formed film,
   further forming a film on the surface from which the blister has been destroyed and removed with the use of difference in adsorption probability between the substrate surface protected by the blister and the surface not protected to form a two-dimensional pattern.

5. The two-dimensional patterning method according to claim 3, further comprising:
   after destroying and removing the blister together with the reacted film, executing chemical reaction on the surface from which the blister has been destroyed and removed with the use of difference in reactivity between the substrate surface protected by the blister and the surface not protected to form a two-dimensional pattern.

6. The two-dimensional patterning method according to claim 1, wherein the substrate is a silicon substrate or a metal substrate.

7. The two-dimensional patterning method according to claim 1, wherein the blister is formed by hydrogen ion irradiation, deuterium ion irradiation, or helium ion irradiation.

8. The two-dimensional patterning method according to claim 1, wherein the blister has a patterned configuration and is formed by ion irradiation through a mask.

9. The two-dimensional patterning method according claim 1, wherein the blister having has a patterned configuration and is formed by using focused ion beam.

10. The two-dimensional patterning method according to claim 1, wherein the irradiation ion is any one of $Ar^+$, $Kr^+$, and $Xe^+$.

11. The two-dimensional patterning method according to claim 1, wherein the two-dimensional pattern is a two-dimensional pattern including a atom of the substrate and a hetero atom.

12. The two-dimensional patterning method according to claim 1, wherein the two-dimensional pattern is a pattern constructed by using a difference in film structure between the substrate and the blister.

13. The two-dimensional patterning method according to claim 1, wherein the two-dimensional pattern is a pattern including film structures where electrical properties are different.

14. The two-dimensional patterning method according to claim 1, wherein the two-dimensional pattern is a pattern including film structures where reactive properties are different.

15. The two-dimensional patterning method according to claim 14, wherein the two-dimensional pattern is a pattern including film structures where affinities are different.

16. The two-dimensional patterning method according to claim 15, wherein the two-dimensional pattern is pattern including a hydrophilic surface and a hydrophobic surface.

17. A manufacturing method of electronic device, wherein the two-dimensional patterning method according to claim 1 is employed.

18. A manufacturing method of magnetic device, wherein the two-dimensional patterning method according to claim 1 is employed.

* * * * *